Jan. 3, 1933.  H. E. CURTIS  1,893,324
MOTOR VEHICLE CONSTRUCTION
Filed May 11, 1929  2 Sheets-Sheet 1
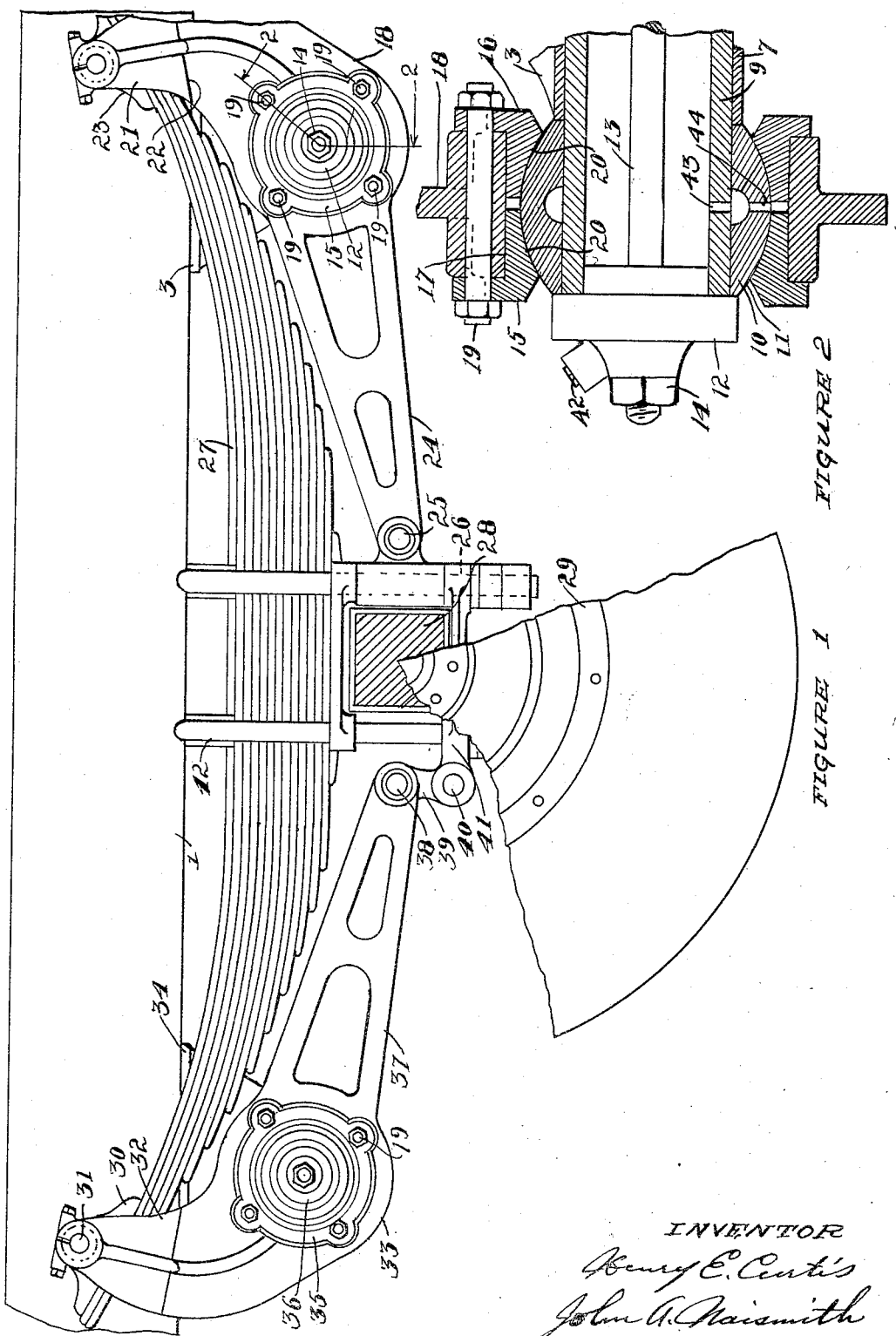
INVENTOR
Henry E. Curtis
John A. Naismith
ATTORNEY

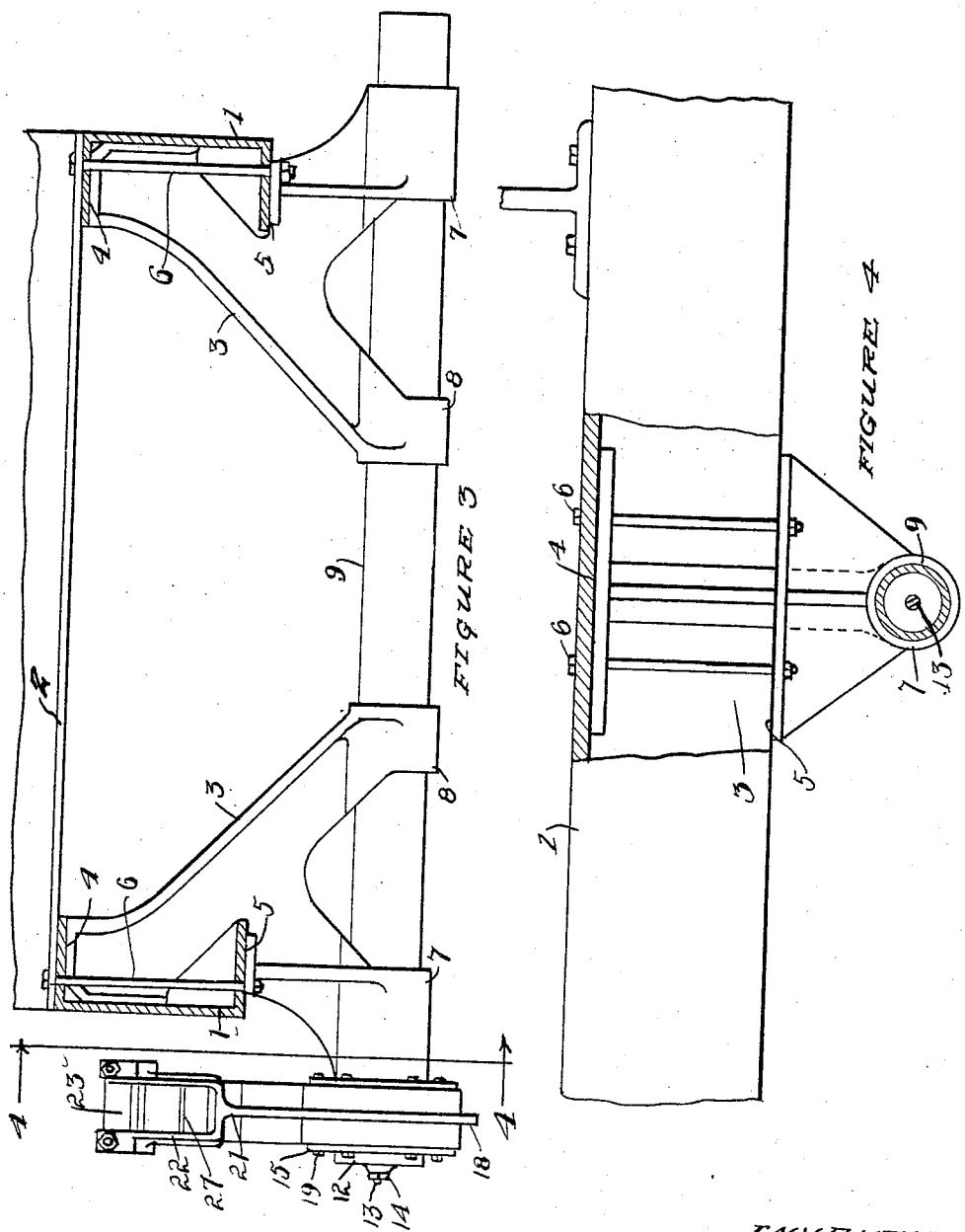

Patented Jan. 3, 1933

1,893,324

UNITED STATES PATENT OFFICE

HENRY E. CURTIS, OF SAN JOSE, CALIFORNIA, ASSIGNOR OF ONE-HALF TO JOHN H. BETTS, OF LONG BEACH, CALIFORNIA

MOTOR VEHICLE CONSTRUCTION

Application filed May 11, 1929. Serial No. 362,208.

This invention relates particularly to supporting means inserted between the vehicle frame and the axle.

It is one object of the invention to provide a means of the character indicated that will permit the axle to assume an angular position relative to the plane of the frame independently of spring action.

It is another object of the invention to provide a structure of the character indicated that will effectively absorb the sudden jars and vibrations occasioned by moving the vehicle over uneven ground, and effectively and smoothly break the rebound after a sudden spring compression.

It is also an object to provide a structure of the character indicated that will secure the desired results without the use of the customary supplementary springs or devices now commonly inserted between the main spring and body.

It is still another object to provide a means of the character indicated that will permit a limited relative rocking movement between the frame and axle without twisting the springs.

It is still a further object of the invention to provide a simple and efficient means for mounting the structure upon the vehicle frame.

Finally, it is an object of the invention to provide a structure of the character indicated that will be economical to manufacture, quickly and easily assembled or disassembled, of few parts, strong, durable, and highly efficient in its practical application.

In the drawings:

Figure 1 is a side elevation of a structure assembled in accordance with my invention, part broken away.

Figure 2 in an enlarged detail section on line 2—2 of Figure 1, part broken away, and part in elevation.

Figure 3 is a transverse section of a portion of a vehicle showing an end elevation of the structure embodying my invention, part being omitted.

Figure 4 is a view on line 4—4 of Figure 3, parts broken away.

Referring now more particularly to the drawings, I show at 1—1 the longitudinal side members of the vehicle frame, and at 2 a portion of a cross member mounted thereon and secured thereto.

In carrying out my invention, I provide a pair of brackets as 3—3 having seats 4—4 and 5—5 to receive the members 1—1 and to which they are bolted as at 6—6. These brackets are provided with aligned and spaced collars as 7—7 and 8—8, and in these collars is cast a tube 9 so as to be an integral part thereof, the tube supporting and spacing the collars as shown.

The ends of the tube 9 extend a short distance beyond their adjacent brackets 3—3, each end supporting a bearing member as 10 having a spherical bearing surface as 11. These members are held in position by means of a cap as 12 mounted on each end of the tube and secured by a rod as 13 having threaded engagement with nuts 14 bearing against the ends of the tube.

Mounted on each bearing surface 11 and lying in a plane perpendicular to the tube 9 is a lever support and bearing member comprising a pair of plates as 15 and 16. The plates together provide an outer seat as at 17 for a lever 18 and are secured together by means of bolts as 19 passing transversely therethrough and through the said lever 18. The inner surfaces of the plates 15—16 have a spherical surface adapted to engage and bear upon the surface 11 of bearing 10. Since the plates 15—16 are mounted upon opposite sides of a median plane intersecting the bearing 10 at right angles to its axis they are assembled by placing plate 16 in position, then placing the lever 18 and plate 15 in position and bolting them together. The plates 15—16 are bevelled at 20, and the other parts of the structure so far described are so proportioned that the unitary structure 15—19 can not only rotate on the surface 11 in the said median plane, but also at right angles thereto and at any angle therebetween, the arrangement providing, in effect, a universal joint within the limits indicated. Tensioning the rod 13 securely binds the bearing 10 in position, and the lines of force developed are distributed through the brackets 3—3 to cross members 2 as well as through the tube 9.

The lever 18 has an upwardly directed short arm 21 forked as at 22 to support a pivotally mounted shoe 23, and a long arm 24 pivotally mounted as at 25 to the collar 26 which assists in securing the spring 27 to the axle 28 which carries the wheel 29. These parts are so proportioned that when assembled as set forth the shoe 23 rides upon the upper surface of the adjacent free end of the spring 27.

The other end of the spring 27 engages a shoe 30 pivotally mounted at 31 to the short arm 32 of a lever 33 which is mounted upon a bracket 34 on frame 1 in the same manner as lever 18, the outer plate 35 corresponding to plate 15 and cap 36 only showing in the drawings. The lever 33 is identical in form and size with lever 18 and is interchangeable therewith, the long arm 37 however, being pivotally connected at 38 with a link 39 which is in turn pivoted as at 40 to an element 41 rigidly mounted upon the collars or yokes 26 and 42.

It may now be seen that when the structure is assembled as set forth the weight of the frame 1 and the load carried thereby is carried equally to the levers 18 and 33 through brackets 3 and 34 and the parts mounted thereon, and through the levers to the opposite ends of the spring. It should be noted that in each case the long arm of the lever is pivoted at a point adjacent the axle which carries the central portion of the spring, and that the load is applied to the ends of the spring through the short end of the lever, this end curving upwardly to increase the leverage and to bring the lever and its fulcrum below the spring.

Since the levers 18 and 33 are mounted on fixed brackets 3 and 34 it follows that when the spring 27 flattens out under a load and the long arms of the levers are moved toward a horizontal position and around their respective centers as centers, their opposing ends will draw towards each other, and the link 39 is inserted as set forth to permit this movement.

An important feature of this invention is the manner in which the lever is mounted upon its supporting bearing. Since the bearing surface 11 is spherical it follows that the lever may pivot thereon about its axis as the load fluctuates, and it may also swing laterally so that as the wheel 29 rises and falls as it travels over successive irregularities in the road surface the axle and spring and levers and connecting parts may tilt relative to the frame 1 and its load which will maintain its normal balanced position.

In this construction the shoe as 23 is not positively connected to the spring but has a sliding contact therewith so that the spring may flatten out as may be necessary and yet no swinging connecting parts are required. It should also be pointed out that the shoe functions as a snubber relative to that end of the spring it engages, the spring length varying to suit its work.

Another important feature in this invention is the casting of the tube 9 in and as an integral part of the brackets 3—3 whereby a large portion of the stresses and strains applied to the ends of the tube are effectually distributed through the vehicle frame instead of being concentrated in the center of the tube.

While this form of vehicle mounting is exceptionally flexible it offers an unusual amount of control over the vertical movements of the axle and consequently has a decided effect upon its load carrying qualities.

For instance, assume that the frame 1 is carrying a heavy load. This weight is carried directly to the two levers 18—33 and then by their short arms to the spring and their long arms to the axle 28. Now if some irregularities in the road tend to throw the axle upwardly that very tendency will operate through the parts to hold the axle down with the result that the load on frame 1 is undisturbed. It is clear that an upward movement of the axle relative to the frame 1 will move the center of the spring 27 upwardly but will also carry upwardly the ends of the long arms 24—37 of the levers 18—33. This action of the levers will pull their short arms downwardly so that the combined upward movement of the axle and downward movement of the short arms of the two levers will combine to flatten out the spring 27. This flattening of the spring will of course cause it to exert a greater pressure upon the axle and force it down to its normal position relative to the frame. In fact the movement of the axle to rise is so promptly counteracted in the manner above set forth that it is maintained in contact with the ground practically all of the time, and never are its movements sufficiently pronounced to materially effect the smooth riding of the frame and its load.

Lubrication of the bearing 10 is effected by filling the tube 9 with a suitable lubricant through the part 42, the lubricant feeding out to the bearing as needed through passages 43 and 44.

It is to be understood, of course, that while I have herein shown and described but one specific embodiment of the invention, changes in form, construction, and method of assembly and operation may be made within the scope of the appended claims.

I claim:

1. In a vehicle, the combination of an axle, supporting means mounted on the vehicle and symmetrically positioned on opposite sides of the axle; a lever pivotally mounted intermediate its ends on each support for both a longitudinal and lateral rocking movement with respect thereto and having pivotal connection with the axle, a spring mounted on the axle and extending to points adjacent the supports, and a sliding connection between each end of the spring and the adjacent end of the lever.

2. In a vehicle, the combination of a frame, spaced supports mounted thereon, an axle positioned between the supports, a spring mounted on the axle and extending to points adjacent the supports, and a lever mounted intermediate its ends on each support for both a longitudinal and lateral rocking movement with respect thereto and engaging the adjacent end of the spring and adjacent side of the axle.

3. A vehicle comprising a frame, a pair of spaced supports fixedly mounted thereon, an axle normally positioned in parallel relation to the supports and midway therebetween, a spring fixedly mounted on the axle and extending over both supports, and a lever pivotally mounted on each support and having one upstanding short arm connected to the adjacent end of the spring, and a long arm extending angularly downwardly to a point adjacent the said axle, a pivotal connection between one long arm and the axle, and a link pivotally connected to the other long arm and the axle.

4. A vehicle comprising a frame, spaced supports depending therefrom, an axle positioned between the supports, a spring mounted on the axle and overlying the supports, and a lever pivotally mounted intermediate its ends on each support and having sliding engagement with the upper surface of the adjacent end of the spring, and having pivotal connection with the axle.

5. A vehicle comprising a frame, spaced supports mounted thereon, an axle positioned between said supports, a spring mounted on the axle and extending over said supports, a lever pivotally mounted on each support and having a long arm having pivotal connection with the axle and a short arm extending upwardly to a point adjacent the near end of the spring, a shoe pivotally mounted in the end of each short arm to engage the upper surface of the near end of the spring.

6. In a device of the character described, a vehicle frame, a support mounted thereon, a bearing member having the form of an annular spherical segment mounted on the support with its bases at right angles to the axis of the support and concentric therewith, stops on either side of the bearing member, and a lever having a spherical bearing surface engaging the bearing member, the perpendicular distance between the edges of the spherical surface of the lever being less than the perpendicular distance between the edges of the spherical surface of the bearing member.

7. In a vehicle, the combination of a frame, spaced supports mounted thereon, an axle positioned between the supports, a spring mounted on the axle and extending over the supports, and a lever mounted on each support to engage the adjacent end of the overlying spring and adjacent side of the axle, each lever and its support having engaging annular spherical segmental surfaces of different widths.

8. In a vehicle, the combination of a frame, spaced supports mounted thereon, an axle positioned between the supports, a spring mounted on the axle and extending over the supports, and a lever mounted on each support to engage the adjacent end of the overlying spring and the adjacent side of the axle, each lever and its support having engaging annular spherical segmental surfaces of different widths, and means to limit the relative lateral movement of the lever and support.

9. In a vehicle, the combination of a rigid frame, aligned brackets rigidly mounted on opposite sides thereof, a tubular member cast integrally with the brackets and extending beyond the sides thereof, bearing members mounted on the ends of the tubular member, to bear against the brackets, end members mounted on the tubular member to bear against the bearing members, and tensioning means passing through the tubular member and engaging both end members.

10. In a vehicle, an axle, a spring mounted thereon, a frame, and a lever connected intermediate its ends to the frame and connected to the spring and fulcrumed upon the frame and longitudinally and laterally tiltable with respect thereto.

11. In a vehicle, an axle, a spring mounted thereon, a frame, a lever pivotally connected intermediate its ends to the frame and having sliding engagement with the spring and fulcrumed upon the frame and longitudinally and laterally tiltable with respect thereto.

12. In a vehicle, a frame, an axle, a spring mounted on said axle, a lever having one end pivotally connected to the axle and having its opposite end slidably engaged with said spring, and means carried intermediate the ends of the lever and engaging said frame, said last named means having a part to permit lateral and longitudinal movement of the lever with respect to the frame.

13. In a vehicle, a frame, an axle, a spring mounted on said axle, and an arm pivoted at one end to said axle and having its opposite end slidably engaging the adjacent free end of said spring, said arm having a part between its ends formed to permit longitudinal and lateral movement thereof relative to the frame.

14. In a vehicle, a frame, an axle, a lever universally connected intermediate its ends to the frame, a link member connecting one end of the lever and axle, and means for slidably connecting the opposite end of the lever and spring.

15. In a vehicle, a frame, an axle, a spring mounted on said axle, a lever universally connected intermediate its ends to the frame, a movable member connecting one end of the lever and axle and means for slidably connecting the opposite end of the lever and spring.

HENRY E. CURTIS.